(12) United States Patent
Fujikawa et al.

(10) Patent No.: US 8,052,327 B2
(45) Date of Patent: Nov. 8, 2011

(54) HYDROSTATIC GAS BEARING, ROTATOR AND CT SCANNER

(75) Inventors: Yoshio Fujikawa, Iwata (JP); Junichi Hirata, Iwata (JP)

(73) Assignee: NTN Corporation, Osaka (JP)

( * ) Notice: Subject to any disclaimer, the term of this patent is extended or adjusted under 35 U.S.C. 154(b) by 745 days.

(21) Appl. No.: 12/155,422

(22) Filed: Jun. 4, 2008

(65) Prior Publication Data
US 2009/0034887 A1  Feb. 5, 2009

(30) Foreign Application Priority Data

Jun. 4, 2007  (JP) .................................. 2007-148385
Aug. 3, 2007  (JP) .................................. 2007-202977

(51) Int. Cl.
*F16C 32/06* (2006.01)
*F16C 17/03* (2006.01)
(52) U.S. Cl. .......... 384/114; 384/99; 384/109; 384/117; 384/312
(58) Field of Classification Search .................. 384/111, 384/114, 116–119, 122, 134, 109, 306, 308, 384/309, 317, 312; 378/15, 17, 19, 146, 378/189, 196
See application file for complete search history.

(56) References Cited

U.S. PATENT DOCUMENTS

| | | | | |
|---|---|---|---|---|
| 1,880,353 A * | 10/1932 | Michell | ............... | 384/309 |
| 3,093,426 A * | 6/1963 | Cornford | ............... | 384/310 |
| 3,874,778 A * | 4/1975 | Kato et al. | ............... | 359/200.1 |
| 3,926,482 A * | 12/1975 | Schuller et al. | ............... | 384/103 |
| 4,032,199 A * | 6/1977 | Jenness | ............... | 384/310 |
| 4,643,592 A * | 2/1987 | Lewis et al. | ............... | 384/114 |
| 4,913,563 A * | 4/1990 | Veronesi et al. | ............... | 384/312 |
| 5,473,657 A * | 12/1995 | McKenna | ............... | 378/4 |
| 5,531,523 A * | 7/1996 | Subbiah | ............... | 384/117 |
| 5,547,287 A * | 8/1996 | Zeidan | ............... | 384/117 |
| 5,743,654 A * | 4/1998 | Ide et al. | ............... | 384/117 |
| 6,276,145 B1 * | 8/2001 | Sharpless et al. | ............... | 378/15 |
| 6,404,845 B1 * | 6/2002 | Sharpless et al. | ............... | 378/15 |
| 6,623,164 B1 * | 9/2003 | Gozdawa | ............... | 384/117 |
| 2007/0230654 A1 * | 10/2007 | Chappo et al. | ............... | 378/15 |

FOREIGN PATENT DOCUMENTS

| | | | |
|---|---|---|---|
| JP | 03024319 A | * | 2/1991 |
| JP | 08121469 A | * | 5/1996 |
| JP | 2004-528113 | | 9/2004 |
| WO | WO 02/089671 A2 | | 11/2002 |

* cited by examiner

*Primary Examiner* — Marcus Charles
(74) *Attorney, Agent, or Firm* — McDermott Will & Emery LLP

(57) ABSTRACT

A hydrostatic gas bearing capable of easily adjusting a clearance between a rotor and a radial bearing pad is provided. This hydrostatic gas bearing comprises a radial bearing pad radially supporting a rotor, a linear motion guide moving the radial bearing pad and a ball stud swingably coupling the radial bearing pad to the linear motion guide. The linear motion guide moves the radial bearing pad in a direction intersecting with a direction connecting the center of rotation of the rotor and the ball stud with each other. The quantity of adjustment in movement of the radial bearing pad caused by the linear motion guide is larger than the quantity of change in the clearance between the outer peripheral surface of the rotor and the radial bearing pad, whereby a small quantity of the bearing clearance can be precisely adjusted.

12 Claims, 7 Drawing Sheets

HYDROSTATIC GAS BEARING, ROTATOR AND CT SCANNER

BACKGROUND OF THE INVENTION

1. Field of the Invention

The present invention relates to a hydrostatic gas bearing, a rotator and a CT scanner, and more particularly, it relates to a hydrostatic gas bearing supporting a rotor, a rotator supported by this hydrostatic gas bearing and a CT scanner employing this rotator.

2. Description of the Background Art

In the field of roller bearings generally used for supporting rotors, hydrostatic gas bearings are increasingly employed in order to implement high-speed/high-precision rotation, low noise, low vibration, long life etc.

For example, a CT scanner in the field of medical diagnostic image formation has a rotating shaft loaded with a radiation source or the like. National Patent Publication Gazette No. 2004-528113 discloses an example of supporting a rotating shaft of a CT scanner with a hydrostatic gas bearing in order to 1) increase the speed of the CT scanner for reducing the scanning time, 2) obtain a silent operation of the scanner unit, and 3) reduce the maintenance frequency by preventing a contact portion from wearing.

National Patent Publication Gazette No. 2004-528113 describes such a structure that a rotating gantry has an annular bearing race on the outer periphery thereof so that the rotating gantry is supported on the bearing race in a noncontact manner by a plurality of hydrostatic bearing pads held on a fixed gantry. According to this structure, a radial bearing pad supports a polished outer peripheral surface on the outer side of the bearing race, and an axial bearing pad supports flat axial surfaces from the both sides of the bearing race.

A radial ball stud is set at the back (opposite to the side facing the rotating shaft) of the radial bearing pad, and a spring element is provided between the radial bearing pad and the ball stud. The radial bearing pad is arranged in the vicinity of the outer periphery of the bearing race, and held on a prescribed position by the radial ball stud. In other words, the radial ball stud is tightened from behind up to desired tension in the radial direction of the rotating shaft through the spring element, and the radial position of the radial bearing pad is controlled by adjusting the radial ball stud.

According to National Patent Publication Gazette No. 2004-528113, the ball stud is adjusted in a direction of a straight line connecting the center of rotation of the rotating shaft and the forward end of the ball stud with each other. In other words, the ball stud moves the radial bearing pad in a direction parallel to the direction connecting the center of rotation of the rotating shaft and the forward end of the ball stud with each other. Therefore, the quantity of position control of the ball stud directly decides the position of the radial bearing pad arranged in front of the ball stud with respect to the rotating shaft, i.e., the quantity of a bearing clearance (clearance between the radial bearing pad and the rotating shaft).

However, this bearing clearance is so small (generally not more than 1 mm) that the ball stud must be finely adjusted in order to adjust the quantity of the bearing clearance. Particularly in a used state of a rotator disclosed in National Patent Publication Gazette No. 2004-528113, i.e., in such a state that the axial direction of the rotor is arranged substantially horizontal, the weight of the rotating shaft is directly applied to the radial bearing pad arranged under the rotating shaft. In this state, it is extremely difficult to adjust the bearing clearance to an ideal quantity with a screw or the like mounted on the outer periphery of the ball stud at the back of the radial bearing pad.

In the rotator, the rotor is desirably as compact and lightweight as possible, in consideration of the load capacity of the hydrostatic gas bearing, the driving force of a motor rotating the rotor and the cost for the rotator.

In the rotator described in National Patent Publication Gazette No. 2004-528113, however, the radial bearing pad supports the outer peripheral surface of the bearing race, and hence the bearing race must have a sufficient width (thickness) to be supported by the radial bearing pad. Therefore, the thickness of the outer diametral portion of the rotor is increased, and the weight of the rotor, the moment of inertia around the rotating shaft in rotation and the driving force necessary for the rotation are also increased. Further, the radial bearing pad supports the rotor on the outer diametral portion of the bearing race, and hence the size of the overall rotator is also increased.

SUMMARY OF THE INVENTION

An object of the present invention is to provide a hydrostatic gas bearing simplifying adjustment of a clearance between a rotor and a radial bearing pad.

Another object of the present invention is to provide a rotator allowing compactification of a rotor thereby enabling weight reduction of the rotor, reduction of a moment of inertia etc.

The hydrostatic gas bearing according to the present invention is a hydrostatic gas bearing supporting a rotor, comprising a radial bearing pad radially supporting the rotor, a moving member moving the radial bearing pad and a coupling portion swingably coupling the radial bearing pad to the moving member. The moving member moves the radial bearing pad in a direction intersecting with a direction connecting the center of rotation of the rotor and the coupling portion with each other.

In this case, the quantity of change in the distance between the center of rotation of the rotor and the coupling portion, i.e., the quantity of change in a bearing clearance can be made smaller than the quantity of adjustment in the movement of the radial bearing pad caused by the moving member. In other words, the quantity of adjustment in the movement of the radial bearing pad is larger than the quantity of change in the bearing clearance, whereby the quantity of the bearing clearance can be finely precisely adjusted.

The moving member preferably moves the radial bearing pad in a direction orthogonal to the direction connecting the center of rotation of the rotor and the coupling portion with each other or in the vicinity thereof, so that the quantity of adjustment in the movement of the radial bearing pad can be much larger than the quantity of change in the bearing clearance. For example, the angle formed by the direction where the moving member moves the radial bearing pad and the direction connecting the center of rotation of the rotor and the coupling portion with each other is preferably in the range of 90°±20°, more preferably in the range of 90°±10°. While a feed screw is generally employed for transferring the radial bearing pad in order to adjust the bearing clearance (generally not more than 1 mm), the pitch (distance between two adjacent screw threads) of the feed screw is generally about 1 mm. When the angle formed by the direction where the moving member moves the radial bearing pad and the direction connecting the center of rotation of the rotor and the coupling portion with each other is in the range of 90°±20°, the ratio of the quantity of adjustment in the movement of the radial bearing pad is at least 5 times larger than the quantity of change in the bearing clearance. Therefore, the quantity of adjustment in the movement of the radial bearing pad can be precisely adjusted to less than 0.2 mm with a single rotation of the feed screw. When the aforementioned angle is in the range of 90°±10°, further, the aforementioned ratio can be set to at least 10, whereby the quantity of adjustment in the movement of the radial bearing pad can be more precisely adjusted to less than 0.1 mm with a single rotation of the feed screw.

In order to make the quantity of adjustment in the movement of the radial bearing pad larger than the quantity of change in the bearing clearance, the angle formed by the direction where the moving member moves the radial bearing pad and the direction connecting the center of rotation of the rotor and the coupling portion with each other may vary with the movement of the radial bearing pad. According to this structure, the direction of the movement of the radial bearing pad may be either linear or curved. If the aforementioned angle is regularly 90°, however, the bearing clearance cannot be changed. When the radial bearing pad is moved along a curve having the same curvature as the rotor, for example, the bearing clearance remains unchanged regardless of the movement of the radial bearing pad. In other words, the aforementioned angle must not be regularly 90°.

Preferably in the aforementioned hydrostatic gas bearing, the moving member includes a ball stud having a spherical forward end. A recess is formed on a portion of the radial bearing pad not opposed to the rotor. The coupling portion is formed by inserting the forward end of the ball stud into the recess.

In this case, the radial bearing pad and the moving member are coupled with each other through a spherical body provided on the forward end of the ball stud. The ball stud supports the radial bearing pad to be freely inclinable with respect to the moving member. Thus, the radial bearing pad is movable in the circumferential direction of the rotor while varying inclination with respect to the moving member with the shape of the portion of the rotor opposed to the radial bearing pad.

The coupling portion may be constituted of a hinge rendering the radial bearing pad swingable only in the circumferential direction of the rotor. In this case, the radial bearing pad and the moving member are coupled with each other through the hinge. The hinge supports the radial bearing pad to be freely inclinable with respect to the moving member in the circumferential direction of the rotor. Thus, the radial bearing pad is movable in the circumferential direction of the rotor while varying the inclination with respect to the moving member with the shape of the portion of the rotor opposed to the radial bearing pad.

When the coupling portion is constituted of the hinge, the direction where the radial bearing pad is inclinable with respect to the moving member is limited to the movable direction of the hinge. When the movable direction of the hinge is matched with the circumferential direction of the rotor, the radial bearing pad can be prevented from inclining in the axial direction of the rotor. In other words, no stopper plate or the like may be provided for regulating inclination of the radial bearing pad in the axial direction of the rotor when the coupling portion is constituted of the hinge. Therefore, the structure of the hydrostatic gas bearing can be more simplified.

Preferably in the aforementioned hydrostatic gas bearing, the moving member is a linear motion guide, for moving the radial bearing pad by rectilinear reciprocation of the linear motion guide. In this case, the moving member performs rectilinear reciprocation. Therefore, the angle formed by the direction of the movement of the radial bearing pad and the direction connecting the center of rotation of the rotor and the coupling portion with each other varies with the movement of the radial bearing pad. Therefore, the quantity of the bearing clearance varies with the movement of the radial bearing pad. The quantity of adjustment in the movement of the radial bearing pad is larger than the quantity of change in the bearing clearance, whereby the quantity of the bearing clearance can be finely adjusted in response to the movement of the radial bearing pad.

The rotator according to the present invention comprises a rotor including a hollow cylindrical protrusion. The rotator also comprises a plurality of hydrostatic thrust gas bearings, including an axial bearing pad, axially supporting the rotor with the static pressure of compressed gas. The rotator further comprises a plurality of hydrostatic journal gas bearings, including a radial bearing pad, radially supporting the rotor with the static pressure of compressed gas on the protrusion. Each hydrostatic journal gas bearing is the aforementioned hydrostatic gas bearing.

In this case, the quantity of change in the distance between the center of rotation of the rotor and the coupling portion, i.e., the quantity of change in the bearing clearance can be made smaller than the quantity of adjustment in the movement of the radial bearing pad caused by the moving member of the hydrostatic journal gas bearing. In other words, the quantity of adjustment in the movement of the radial bearing pad is larger than the quantity of change in the bearing clearance, whereby the bearing clearance of the rotor can be more precisely finely adjusted.

The rotor is radially supported on the hollow cylindrical protrusion. The protrusion has a small thickness. Therefore, the weight of the rotor is reduced as compared with a conventional rotor in the form of a thick solid plate with a maximum diametral portion having a necessary width (thickness) to be supported by a radial bearing pad. Also when the width required to the rotor to be supported by the radial bearing pad is identical to that of the conventional rotor, therefore, the moment of inertia in rotation of the rotor and a driving force necessary for the rotation can be reduced.

Preferably, the protrusion is so formed that the size of the protrusion in the axial direction is larger than the maximum size of the structure, such as the axial bearing pad axially supporting the rotor or a support portion thereof, for axially supporting the rotor in the axial direction. While a loaded substance to be loaded on the rotor can be loaded on the forward end surface of the protrusion, the loaded substance can be easily mounted on the forward end surface of the protrusion when this forward end surface protrudes beyond the aforementioned structure.

Preferably in the aforementioned rotator, the outer diameter of the protrusion is smaller than the maximum outer diameter of the rotor. In this case, the rotor may not be supported on the portion having the maximum outer diameter. In other words, the radial bearing pad radially supporting the rotor may be opposed not to the portion having the maximum outer diameter but to the protrusion having the diameter smaller than the portion having the maximum outer diameter. Therefore, the rotor may not have a necessary width to be supported by the radial bearing pad on the portion having the maximum outer diameter, whereby the weight of the rotor can be reduced. Further, the overall rotator can be compactified, i.e., reduced in size. The rotor may be constituted of the protrusion and a flange, and a plurality of axial bearing pads may axially support the rotor on the flange. The rotor may be so formed that the protrusion and the flange form an L shape in a section parallel to the axial direction.

Preferably, the rotor is so arranged that the axial direction thereof is horizontal. The rotor includes a loading portion for loading a loaded substance on one side of the axial direction. The sum of moments acting on the rotor due to axial forces applied by a plurality of axial bearing pads to the rotor is in a direction opposite to a moment acting on the rotor due to gravity acting on the loaded substance.

In this case, the direction of the moments acting on the rotor due to the forces of the axial bearing pads axially supporting the rotor can be opposed to the direction of the moment acting on the rotor due to the load of the loaded substance. Therefore, the sum of the moments acting on the rotor is reduced as compared with a case where only the moment resulting from the load of the loaded substance acts on the rotor. In other words, a loaded substance having a larger weight can be loaded on the rotor when the arrangement of the axial bearing pads is adjusted in consideration of the direction of the moments acting on the rotor due to the axial bearing pads.

The rotor may be used in a state where the axial direction thereof is inclined by several 10 degrees with respect to the horizontal direction, depending on the application thereof. In other words, the rotor is so arranged that the axial direction thereof is substantially horizontal. The direction of the moments acting on the rotor due to the axial bearing pads can be so adjusted that a loaded substance having a large weight can be loaded on the rotor even if the axial direction of the rotor is inclined with respect to the horizontal direction.

In the aforementioned rotor, a plurality of axial bearing pads include at least one first-side axial bearing pad supporting the rotor from a first side in the axial direction and at least one second-side axial bearing pad supporting the rotor from a second side opposite to the first side. A resultant force exerted by the first-side axial bearing pad on the rotor in the axial direction and a resultant force exerted by the second-side axial bearing pad on the rotor in the axial direction are equal in magnitude to each other and opposite in direction to each other.

In this case, a moment opposite in direction to the moment acting on the rotor due to the load of the loaded substance can be exerted on the rotor by adjusting the arrangement of the axial bearing pads on the first and second sides. Therefore, the sum of the moments acting on the rotor is reduced as compared with the case where only the moment resulting from the load of the loaded substance acts on the rotor, and a loaded substance having a larger weight can be loaded on the rotor.

Preferably in the aforementioned rotor, a plurality of axial bearing pads are symmetrized with respect to a vertical plane passing through the center of rotation of the rotor, i.e., a plane passing through the direction of gravity. In this case, the rotor can be more stably supported.

Preferably, a plurality of radial bearing pads are symmetrized with respect to a vertical plane passing through the center of rotation of the rotor, i.e., a plane passing through the direction of gravity. In this case, the rotor can be more stably supported.

A CT scanner according to the present invention comprises the rotor according to any of the aforementioned aspects. The CT scanner also comprises a radiation source and a radiation detector loaded on the rotor of the rotator. In this case, the CT scanner comprising the compactified rotor reduced in weight itself can be reduced in weight and compactified. Further, the moment of inertia in rotation of the rotor and a driving force necessary for the rotation can be reduced.

In the hydrostatic gas bearing according to the present invention, the clearance between the rotor and the radial bearing pad can be easily adjusted.

In the rotator according to the present invention, the rotor can be so compactified that the weight thereof can be reduced and the moment of inertia can also be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
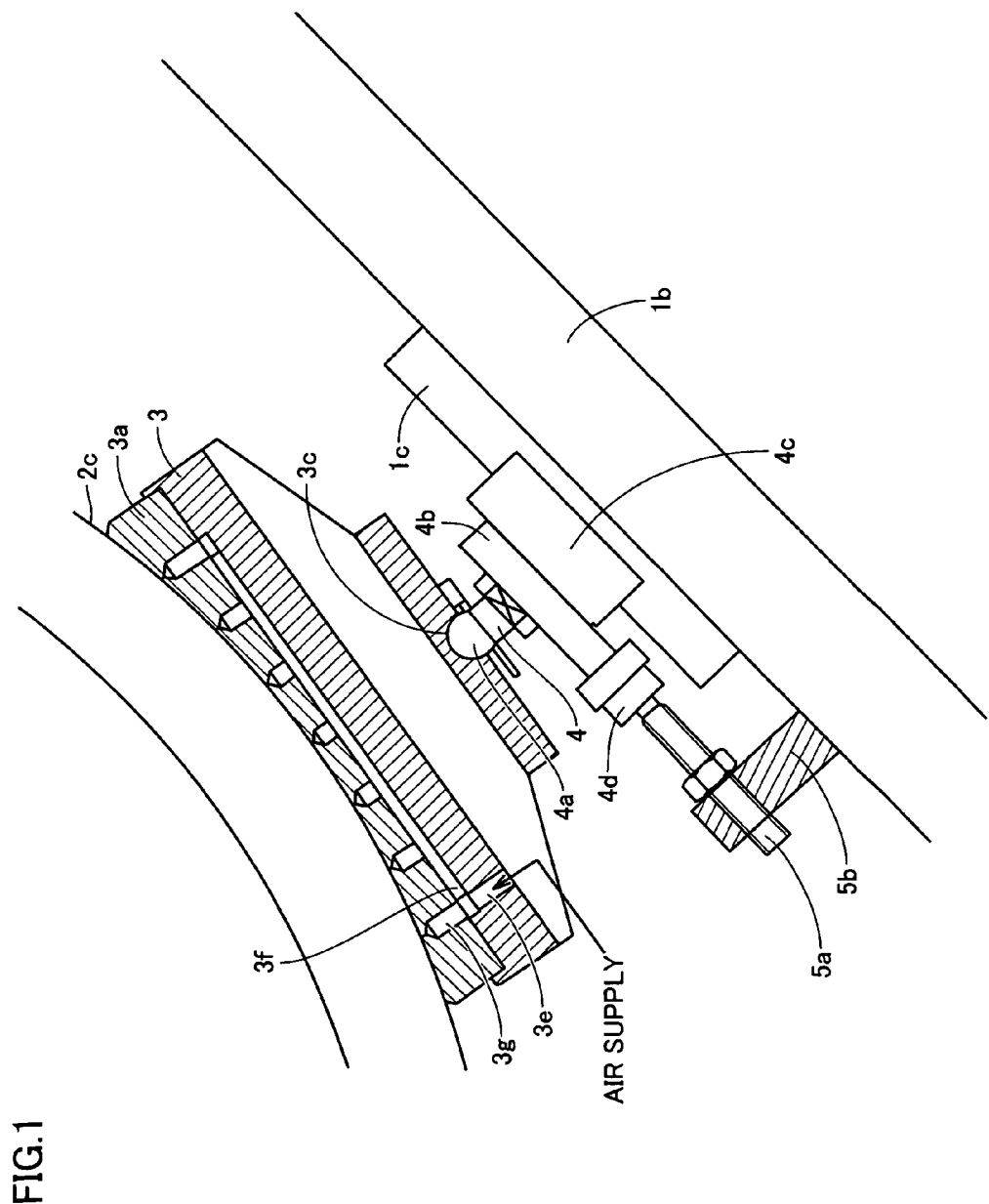
FIG. 1 is a partially fragmented schematic diagram showing the structure of a hydrostatic gas bearing according to a first embodiment of the present invention.

Embodiments of the present invention are now described with reference to the drawings. In the following description with reference to the drawings, portions identical or corresponding to each other are denoted by the same reference numerals, and redundant description is not repeated.

First Embodiment

As shown in FIG. 1, a hydrostatic gas bearing according to a first embodiment of the present invention is provided with a pad bearing portion 3a, to be opposed to an outer peripheral surface 2c of a rotating shaft. A radial bearing pad 3 radially supports the rotating shaft with pad bearing portion 3a on outer peripheral surface 2c of the rotating shaft. The surface of pad bearing portion 3a opposed to outer peripheral surface 2c has a curvature substantially identical to that of outer peripheral surface 2c. In other words, the surface of pad bearing portion 3a opposed to outer peripheral surface 2c has a radius of curvature identical to that of outer peripheral surface 2c or larger than that of outer peripheral surface 2c by a bearing clearance between radial bearing pad 3 and outer peripheral surface 2c. A recess 3c is formed on a side of radial bearing pad 3 opposite to the side provided with pad bearing 3a. Recess 3c is in the form of a spherical surface. Recess 3c may alternatively be so formed as have a tapered surface.

Pad bearing portion 3a is provided with a plurality of air supply holes 3g on an end of the side opposed to outer peripheral surface 2c. Air supply holes 3g are narrowed toward the end of the side opposed to outer peripheral surface 2c. In other words, air supply holes 3g are reduced in diameter toward the openings thereof. Radial bearing pad 3 is provided therein with an air supply groove 3f communicating with plurality of air supply holes 3g and an air supply port 3e communicating with air supply groove 3f. Compressed air is supplied from an external compressed air source (not shown) to air supply port 3e, guided to air supply groove 3f and sprayed from the narrowed openings on the forward ends of air supply holes 3g toward outer peripheral surface 2c of the rotating shaft, to form a hydrostatic journal gas bearing.

A spherical forward end 4a of a ball stud 4 is inserted into recess 3c, to form a coupling portion. The base of ball stud 4 is fixed to an upper plate 4b. Upper plate 4b is loaded on/fixed to a fine adjustment table 4c. Fine adjustment table 4c is assembled into a linear motion guide 1c serving as a moving member fixed to a table base 1b, to be movable along linear motion guide 1c.

A screw end connecting member 4d is mounted on upper plate 4b. A feed screw support 5b provided with a threaded hole on the upper portion thereof is set on table base 1b. A feed screw 5a is inserted into the aforementioned threaded hole. The quantity of feed screw 5a inserted into the threaded hole (feed rate) can be arbitrarily adjusted. Feed screw 5a adjusted in feed rate is arranged on a proper position, and fixed to this position by tightening a flange nut fitted with feed screw 5a serving as a fixed member toward feed screw support 5b, for example.

The forward end surface of feed screw 5a is in contact with screw end connecting member 4d. Fine adjustment table 4c can be rectilinearly reciprocated by rotating feed screw 5a and adjusting the feed rate. When upper plate 4b is moved due to the rectilinear reciprocation of fine adjustment table 4c, ball stud 4 fixed to upper plate 4b is also moved, followed by movement of radial bearing pad 3. The direction of the movement of radial bearing pad 3 (i.e., the direction of the movement of fine adjustment table 4c) intersects with a direction connecting the center of rotation of the rotating shaft and the coupling portion formed by inserting forward end 4a of ball stud 4 into recess 3c. Radial bearing pad 3 is linearly moved so that the angle formed by the direction of the movement of radial bearing pad 3 and the direction connecting the center of rotation of the rotating shaft and the coupling portion varies with the movement of radial bearing pad 3.

Figure 2:
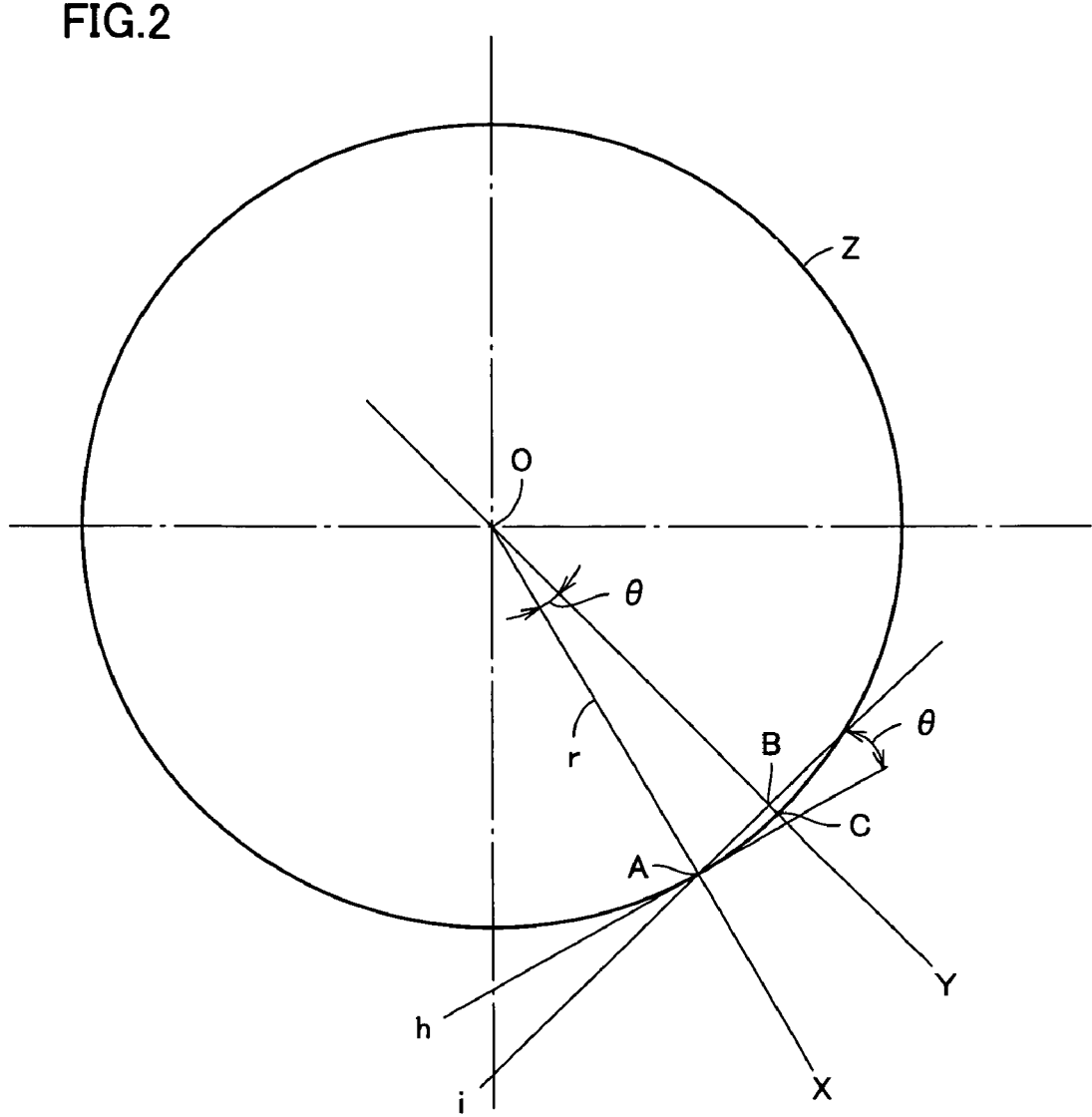
FIG. 2 illustrates the quantity of change in a bearing clearance with respect to the quantity of adjustment in movement of a moving member.

The relation between the quantity of the movement of radial bearing pad 3 caused by the moving member and the quantity of change in the bearing clearance is described with reference to FIG. 2. Referring to FIG. 2, it is assumed that O denotes the center of rotation of the rotating shaft, A denotes the position of forward end 4a of ball stud 4, h denotes the tangent of the rotating shaft at point A, and i denotes a line inclined by a prescribed angle θ with respect to tangent h. It is also assumed that X denotes a normal with respect to tangent h, Y denotes a line inclined by angle θ from line X, and B denotes the intersection between lines Y and i. It is further assumed that C denotes the intersection between line Y and a circle Z having the center at point O with a radius corresponding to the distance r between points O and A.

Consider a case of adjusting rectilinear movement of the position of forward end 4a of ball stud 4 from point A to point B along i. The distance between the position of forward end 4a of ball stud 4 and point O corresponds to r before the movement, and reaches OB, i.e., is reduced by BC after the movement. In other words, the bearing clearance changes by a quantity corresponding to distance BC. The ratio of the quantity AB of adjustment in the movement to distance BC is expressed as follows:

$$BC/AB = r(1-\cos\theta)/r\sin\theta$$

For example, ratio BC/AB is 0.09 when angle θ is 10°. Further, ratio BC/AB is 0.18 when angle θ is 20°. In other words, it follows that quantity BC of change in the bearing clearance is remarkably reduced with respect to the quantity AB of adjustment in the movement.

When radial bearing pad 3 is moved following the rectilinear reciprocation of fine adjustment table 4c as shown in FIG. 1, therefore, it follows that radial bearing pad 3 is moved also in the radial direction of the rotating shaft. Further, it follows that the quantity of radial movement of the rotating shaft with respect to the quantity of adjustment in the movement of radial bearing pad 3 is reduced at a prescribed ratio based on the quantity of adjustment in the movement of radial bearing pad 3. The quantity of change in the distance between the center of rotation of the rotating shaft and ball stud 4, i.e., the quantity of change in the bearing clearance is reduced with respect to the quantity of adjustment in the movement. Thus, the quantity of small movement of radial bearing pad 3 can be easily adjusted in the radial direction of the rotating shaft. In other words, the quantity of adjustment in the movement of radial bearing pad 3 is larger than the quantity of change in the bearing clearance, whereby the quantity of the bearing clearance can be more precisely finely adjusted in the radial direction of the rotating shaft.

The hydrostatic gas bearing is formed by spraying the compressed air toward outer peripheral surface 2c of the rotating shaft, to result in a force supporting the rotating shaft. At this time, a reaction force (bearing reaction force) against the aforementioned force supporting the rotating shaft is applied to radial bearing pad 3. In radial bearing pad 3, pad bearing portion 3a is pressed against forward end 4a of ball stud 4 due to the bearing reaction force. Radial bearing pad 3 is supported to be freely inclinable with respect to linear motion guide 1c, due to spherical forward end 4a of ball stud 4 inserted into recess 3c having the spherical (or tapered) surface. Thus, radial bearing pad 3 is linearly movable following the movement of fine adjustment table 4, and also movable in the circumferential direction of the rotating shaft while automatically adjusting the angle of inclination with respect to linear motion guide 1c in response to the shape of outer peripheral surface 2c of the rotating shaft opposed to radial bearing pad 3.

Radial bearing pad 3 is provided with a stopper plate (not shown) protruding from the side surface thereof toward the side surface of upper plate 4b for regulating deviational rotation of radial bearing pad 3 around a straight line directed toward the center of rotation of the rotating shaft from forward end 4a of ball stud 4.

Figure 3:
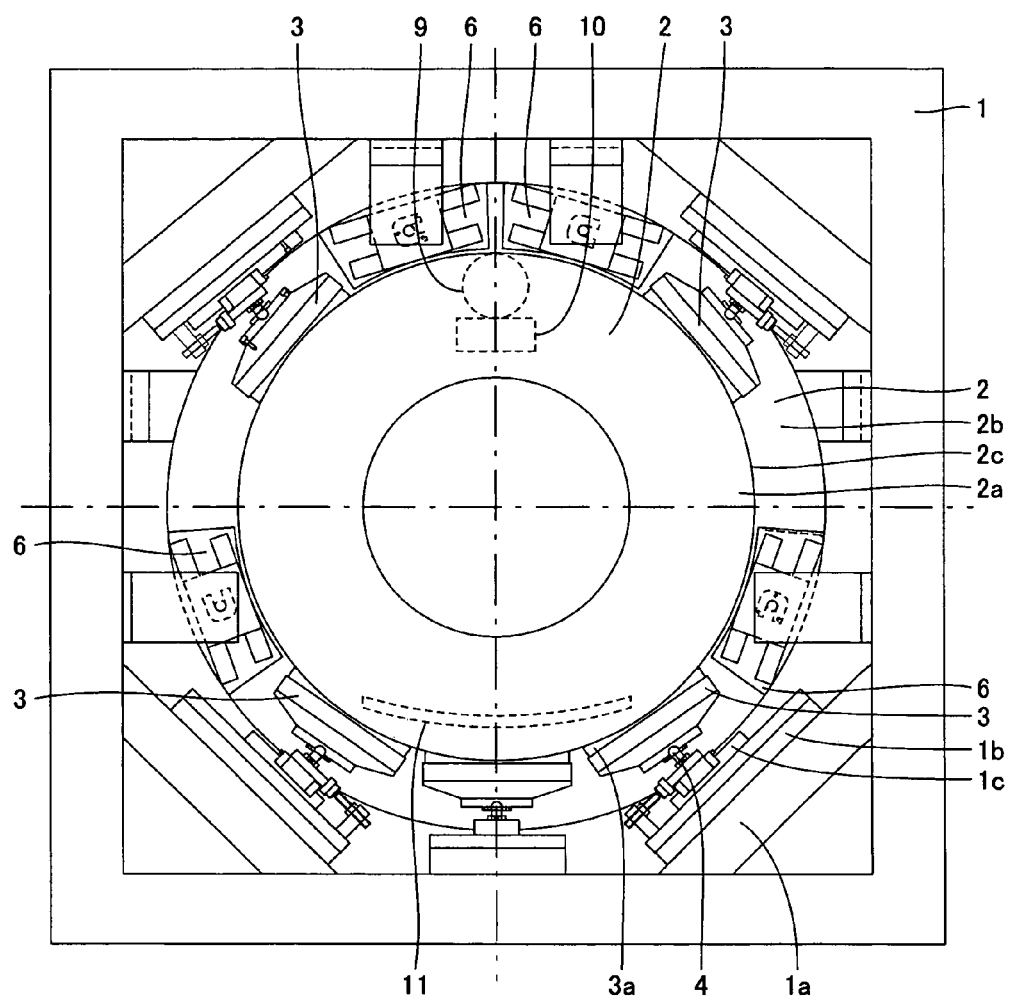
FIG. 3 is a schematic diagram showing the structure of a CT scanner.

A rotator comprising the aforementioned hydrostatic gas bearing is now described. As shown in FIG. 3, a CT scanner serving as an example of the rotator comprises a fixed gantry 1 which is a nonrotational portion and a rotating gantry 2 serving as a rotor. Table supports 1a are set on four corners of fixed gantry 1 in an inclined manner with respect to fixed gantry 1. Table bases 1b are set on table supports 1a. Linear motion guides 1c are fixed onto table bases 1b. A plurality of radial bearing pads 3 radially supporting rotating gantry 2 with hydrostatic pressure of compressed gas are assembled into linear motion guides 1c, to be movable along linear motion guides 1c.

Rotating gantry 2 includes a protrusion, protruding toward front side of the sheet in FIG. 3, constituted of a forward end surface 2a and outer peripheral surface 2c. The protrusion is in the form of a hollow cylinder extending in the axial direction of rotating gantry 2. As shown in FIG. 3, the protrusion is a portion of rotating gantry 2, the outer peripheral surface 2c of which is surrounded and radially supported by plurality of radial bearing pads 3. The base of the protrusion is fixed to an annular flange portion 2b. Thus, the protrusion has a hollow cylindrical shape extending in the axial direction of rotating gantry 2 and protruding toward front side of the sheet in FIG. 3. Rotating gantry 2 is constituted of the protrusion and flange portion 2b.

Figure 4:
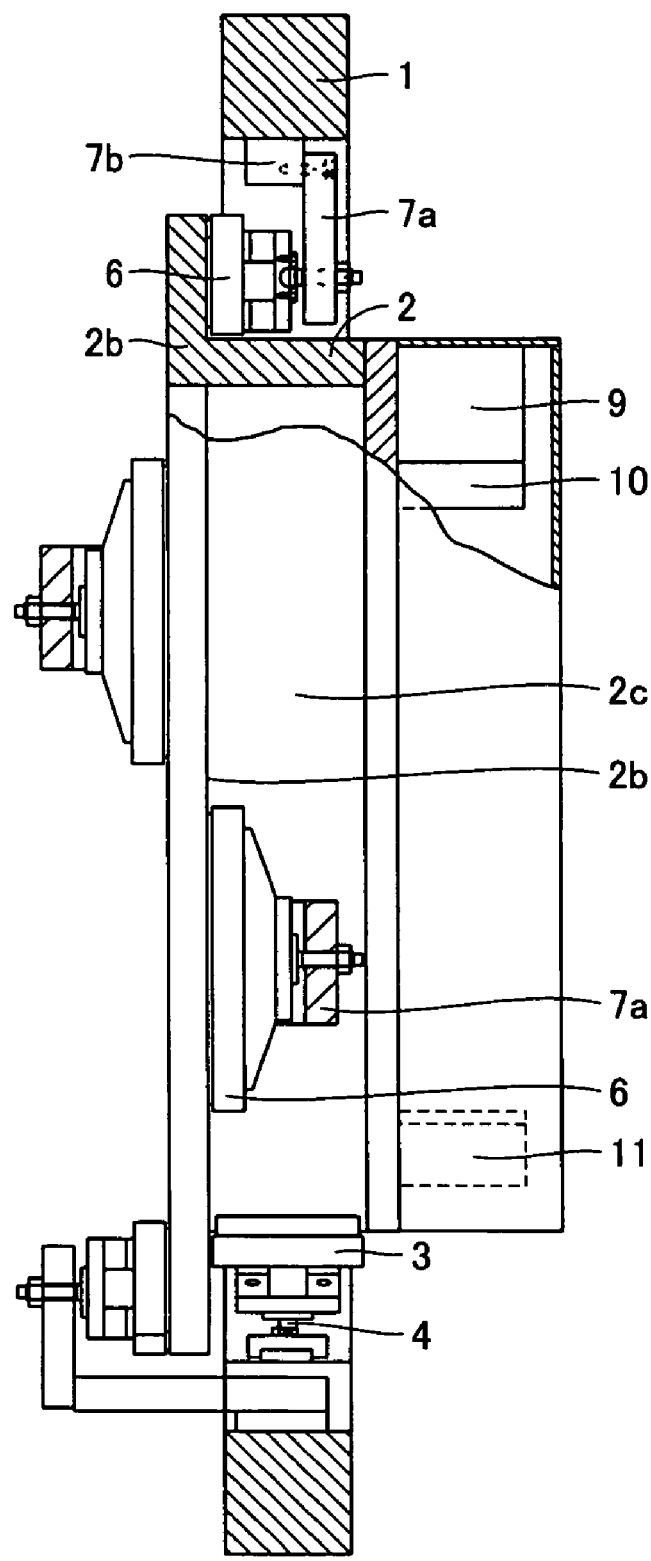
FIG. 4 is a side elevational view of the CT scanner shown in FIG. 3.

FIG. 4 partially shows sections of fixed gantry 1, rotating gantry 2 and flange portion 2b. While FIG. 1 shows the longitudinal direction of radial bearing pad 3, FIG. 4 shows the width direction of each radial bearing pad 3. The protrusion of rotating gantry 2 and flange portion 2b form an L shape in the section of rotating gantry 2, shown in FIG. 4, parallel to the axial direction.

As shown in FIGS. 3 and 4, plurality of radial bearing pads 3 fixed to fixed gantry 1 radially support rotating gantry 2 on outer peripheral surface 2c of the protrusion. The protrusion is in the form of the hollow cylinder having a small thickness. Thus, the weight of rotating gantry 2 is reduced as compared with a conventional rotator having a rotor in the form of a thick solid plate. Therefore, the moment of inertia in rotation of rotating gantry 2 and a driving force necessary for the rotation can be reduced.

Further, the outer diameter of the protrusion is smaller than the maximum outer diameter of rotating gantry 2. Therefore, rotating gantry 2 may not be supported on the portion having the maximum outer diameter. In other words, each radial bearing pad 3 radially supporting rotating gantry 2 can be opposed not to the portion of rotating gantry 2 having the maximum outer diameter but to outer peripheral surface 2c of the protrusion having the diameter smaller than the maximum outer diameter. Consequently, rotating gantry 2 may not have a width necessary to be supported by radial bearing pad 3 on the portion having the maximum outer diameter, and the width of the portion having the maximum outer diameter can be reduced. Therefore, the weight of rotating gantry 2 can be reduced as compared with a conventional rotator having a rotator radially supported by a radial bearing pad on the outer peripheral surface (i.e., maximum diametral portion) of a flange. Further, the overall rotator can be compactified, i.e., reduced in size.

The diameter of outer peripheral surface 2c of the protrusion is preferably minimized with respect to the maximum outer diameter of rotating gantry 2, in order to reduce the weight of rotating gantry 2. For example, the protrusion can be so formed that radial bearing pads 3 are arranged around outer peripheral surface 2c inside the maximum diametral portion of rotating gantry 2 in the radial direction.

Referring to FIG. 3, the CT scanner is so arranged that the axial direction of rotating gantry 2 is horizontal. Radial bearing pads 3 are arranged on five portions of outer peripheral surface 2c of the protrusion. In other words, three radial bearing pads 3 and two radial bearing pads 3 are arranged under and above rotating gantry 2 respectively. Thus, a larger number of radial bearing pads 3 are arranged in a direction where gravity resulting from rotating gantry 2 and a substance loaded thereon acts so that the load of rotating gantry 2 can be efficiently supported with the minimum number of radial bearing pads 3. The effect of supporting the load of rotating gantry 2 with the minimum number of radial bearing pads 3 can be attained not only by adjusting the arrangement of radial bearing pads 3 but also by adjusting other factors such as the diameter and the number of air supply holes 3g, for example.

Further, rotating gantry 2 is axially supported on flange portion 2b by a plurality of axial bearing pads 6 fixed to fixed gantry 1. Axial bearing pads 6 are opposed to flange portion 2b on front side of flange portion 2b shown in FIG. 3 and the rear side (not shown) of flange portion 2b respectively. Axial bearing pads 6 are fixed to forward ends 4a of ball studs 4 held on axial bearing pad support plates 7a fixed to fixed gantry 1 through supports 7b. The aforementioned ball studs 4 are screwed into threaded holes formed in axial bearing pad support plates 7a up to a prescribed position. Thus, clearances between axial bearing pads 6 and flange portion 2b are adjusted to a prescribed quantity.

When holes (not shown) are partially formed in axial bearing pad support plates 7a opposed to axial bearing pads 6 and pins are inserted into these holes so that ends of the pins are fixed to rear end surfaces of axial bearing pads 6, remarkable inclination of axial bearing pads 6 can be regulated.

Compressed air is also supplied to axial bearing pads 6 similarly to radial bearing pads 3 and sprayed toward both surfaces of flange portion 2b of rotating gantry 2, to form a hydrostatic thrust gas bearing. This hydrostatic thrust gas bearing axially supports rotating gantry 2. Thus, the hydrostatic gas bearing axially and radially supports rotating gantry 2 in a noncontact manner. Therefore, rotating gantry 2 can be silently driven at a high speed. Further, rotating gantry 2 has no worn part due to the noncontact support, to be maintenance-free.

When the surfaces of radial and axial bearing pads 3 and 6 opposed to rotating gantry 2 have the minimum areas capable of stably supporting rotating gantry 2, the CT scanner can be further compactified.

As shown in FIGS. 3 and 4, a CT scanner for medical diagnosis has a prescribed test region where an imaged object is arranged. For example, a radiation source 9 such as an X-ray tube forms a radiation beam. The radiation beam is parallelized through a collimator/shutter assembly 10. The radiation beam is applied to a radiation detector 11 in the form of a thin sector opposed across the test region. In image formation, radiation source 9 rotates around the test region while emitting the radiation beam, and the radiation beam (X-ray, for example) passing through the imaged object (a patient in the test region, for example) is incident upon radiation detector 11, which in turn collects data such as the intensity of the radiation beam.

Radiation source 9, collimator/shutter assembly 10 and radiation detector 11 are generally loaded on forward end surface 2a of rotating gantry 2, while radiation source 9 and collimator/shutter assembly 10 are opposed to radiation detector 11. A large number of other attachments (not shown) such as a power source, for example, are also set on forward end surface 2a. In other words, rotating gantry 2 includes a loading portion for loading radiation source 9 etc. as loaded substances on forward end surface 2a. A moment in a prescribed direction (clockwise direction in the arrangement of the CT scanner shown in FIG. 4) acts on rotating gantry 2 due to the weights of the loaded substances. On the other hand, the arrangement of axial bearing pads 6 is so adjusted that a moment in a direction opposite to the prescribed direction of the aforementioned moment (anticlockwise direction in the arrangement of the CT scanner shown in FIG. 4) acts on rotating gantry 2. Thus, the sum of the moments acting on rotating gantry 2 can be reduced as compared with a case where only the moment resulting from the loads of the loaded substances acts on rotating gantry 2.

Figure 5C:
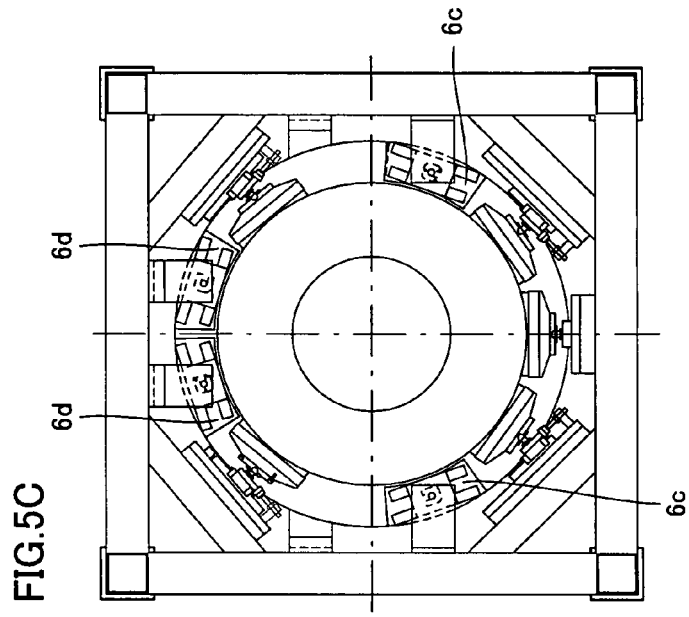
FIG. 5C is a front elevational view of the CT scanner.
Figure 5B:
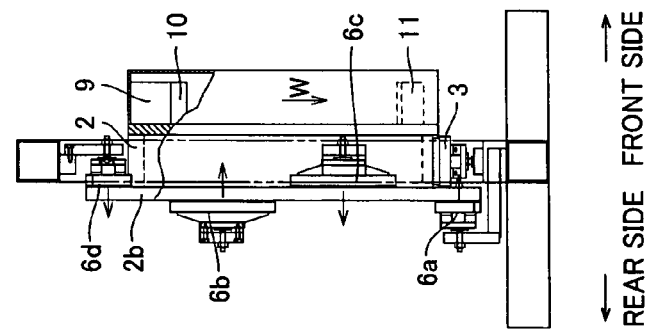
FIG. 5B is a side elevational view of the CT scanner.
Figure 5A:
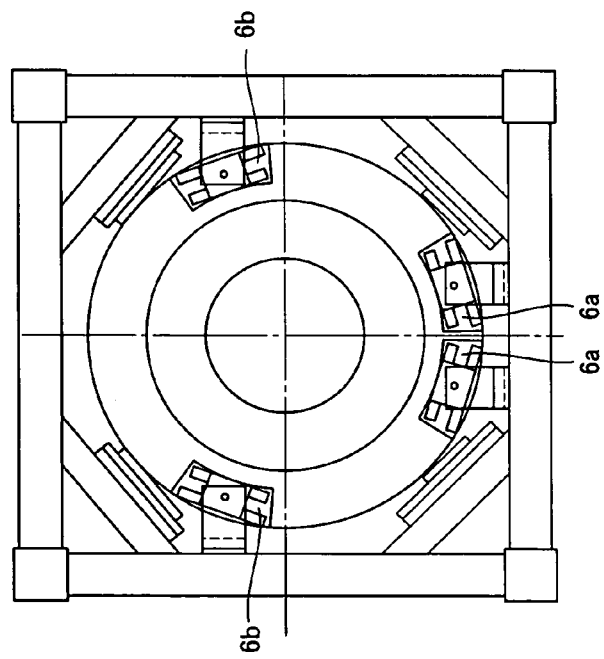
FIG. 5A is a rear elevational view of the CT scanner.

FIGS. 5A to 5C show the arrangement of axial bearing pads 6 in the CT scanner. As shown in FIGS. 5A and 5C, axial bearing pads 6a, 6b, 6c and 6d are symmetrized with respect to vertical planes passing through the center of rotation of rotating gantry 2 (i.e., planes passing through the direction of gravity). As shown in FIG. 3, radial bearing pads 3 are also symmetrized with respect to the vertical planes passing through the center of rotation of rotating gantry 2. Thus, the hydrostatic gas bearings are symmetrized so as to stably support rotating gantry 2 in the axial and radial directions for preventing the center of rotation of rotating gantry 2 from shaking during rotation. Thus, the CT scanner can reduce the number of inconveniences such as axial deviation during rotation of rotating gantry 2, and is improved in reliability.

As shown in FIG. 5B, plurality of axial bearing pads 6a, 6b, 6c and 6d radially support rotating gantry 2 due to the static pressure of the compressed gas. It is assumed that the direction from flange portion 2b of rotating gantry 2 toward forward end surface 2a loaded with radiation source 9 etc. is the front side, and the side opposite thereto is the rear side. Axial bearing pads 6c and 6d axially support rotating gantry 2 from the front side. Axial bearing pads 6a and 6b axially support rotating gantry 2 from the rear side.

A resultant force exerted by axial bearing pads 6a and 6b on flange portion 2b to push rotating gantry 2 toward the front side and a resultant force exerted by axial bearing pads 6c and 6d on flange portion 2b to push rotating gantry 2 toward the rear side are equal to each other. Forces of equal magnitudes are axially applied to rotating gantry 2 in opposite directions. Therefore, rotating gantry 2 is supported on a prescribed axial position.

As shown in FIG. 5A, two axial bearing pads 6a and two axial bearing pads 6b are arranged under and above the center of rotation of rotating gantry 2 respectively on the rear side of rotating gantry 2. As shown in FIG. 5C, two axial bearing pads 6c and two axial bearing pads 6d are arranged under and above the center of rotation of rotating gantry 2 respectively on the front side of rotating gantry 2.

The heights of axial bearing pads 6a to 6d with reference to the center of rotation of rotating gantry 2 shown in FIG. 5B are calculatedly or experimentally set so that the sum of moments acting on rotating gantry 2 due to the forces exerted by the respective ones of axial bearing pads 6a to 6d on rotating gantry 2 is in a direction opposite to the direction of the moment acting on rotating gantry 2 due to the loads of the loaded substances.

Figure 6:
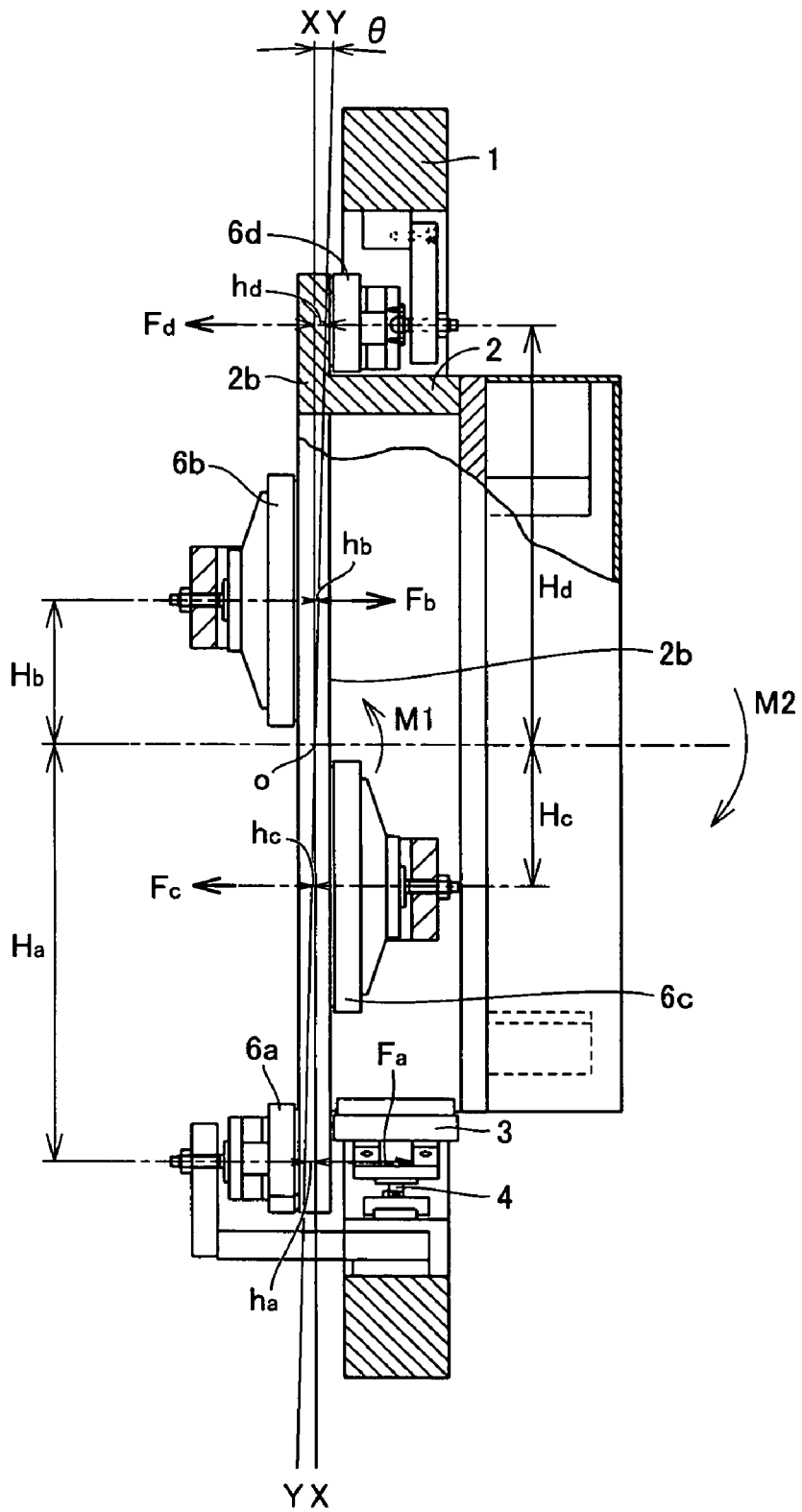
FIG. 6 is a schematic diagram showing the relation between moments acting on a rotor.

The relation between the moments acting on rotating gantry 2 is specifically described with reference to FIG. 6. As shown in FIG. 6, it is assumed that Fa to Fd denote the forces acting on flange portion 2b due to axial bearing pads 6a to 6d respectively. Further, it is assumed that M2 denotes the sum of a "moment acting on rotating gantry 2 due to the own weight of rotating gantry 2", and the "moment acting on rotating gantry 2 due to the loaded substances loaded on forward end surface 2a of rotating gantry 2". In addition, it is assumed that M1 denotes a "moment acting on rotating gantry 2 due to supporting forces of radial bearing pads 3".

It is assumed that a centerline X-X of flange portion 2b of rotating gantry 2 is inclined by a small angle θ toward forward end surface 2a loaded with the loaded substances due to balance of the moments acting on rotating gantry 2 and balanced on a centerline Y-Y. At this time, it is assumed that Ha to Hd denote the heights of axial bearing pads 6a to 6d with reference to the center of rotation of rotating gantry 2 (distances between the centerlines of axial bearing pads 6a to 6d shown in FIG. 6 and the center of rotation of rotating gantry 2) respectively, and ha to hd denote the quantities of change in the bearing clearances of axial bearing pads 6a to 6d resulting from the aforementioned inclination respectively.

At this time, the moments acting on rotating gantry 2 are expressed as follows:

Moment in direction opposite to moment resulting from loaded substances=$Fd \times Hd + Fa \times Ha + M1$ Moment in direction identical to moment resulting from loaded substances=$Fb \times Hb + Fc \times Hc + M2$ Heights Ha to Hd of axial bearing pads 6a to 6d are so set that these moments are balanced, i.e., the following expression holds:

$$Fd \times Hd + Fa \times Ha + M1 = Fb \times Hb + Fc \times Hc + M2$$

In the above, forces Fa to Fb are experimentally or calculatedly obtained beforehand, in correspondence to quantities ha to hd of change in the bearing clearances of axial bearing pads 6a to 6d.

The above relational expression can be transformed as follows:

$$(Fd \times Hd + Fa \times Ha) - (Fb \times Hb + Fc \times Hc) = M2 - M1$$

In the above expression, the left side expresses the "moment acting on rotating gantry 2 due to the forces acting on rotating gantry 2 by axial bearing pads 6a to 6d". On the right side of the above expression, radial bearing pads 3 are supported by ball studs 4 in a freely inclinable manner on the rear side, and the positions thereof are hardly separated from centerline Y-Y. Thus, moment M1 resulting from radial bearing pads 3 is remarkably smaller than moment M2, and negligible. In moment M2, the directions of the "moment resulting from the loads of the loaded substances" and the "moment resulting from the own weight of rotating gantry 2" are identical to each other.

In this CT scanner, therefore, heights Ha to Hd of axial bearing pads 6a to 6d are set so that the "sum of moments acting on rotating gantry 2 due to axial forces (the left side of the above expression)" is in a direction opposite to the "moment acting on rotating gantry 2 due to gravity acting on the loaded substances". Therefore, the sum of the moments acting on rotating gantry 2 is reduced as compared with the case where only the moment resulting from the loads of the loaded substances acts on rotating gantry 2, whereby loaded substances having larger weights can be loaded on forward end surface 2a of rotating gantry 2.

While feed screw 5a is in contact with screw end connecting member 4d so that feed screw 5a and fine adjustment table 4c are regularly integrally moved in the structure of the first embodiment, an elastic member may alternatively be interposed. For example, an elastic member such as a spring can be interposed between feed screw 5a and screw end connecting member 4d or between feed screw support 5b and fine adjustment table 4c. According to this structure, vibration following the rotation of rotating gantry 2 can be absorbed by vibration of fine adjustment table 4c, so that silent rotation of the CT scanner can be implemented.

Second Embodiment

Figure 7:
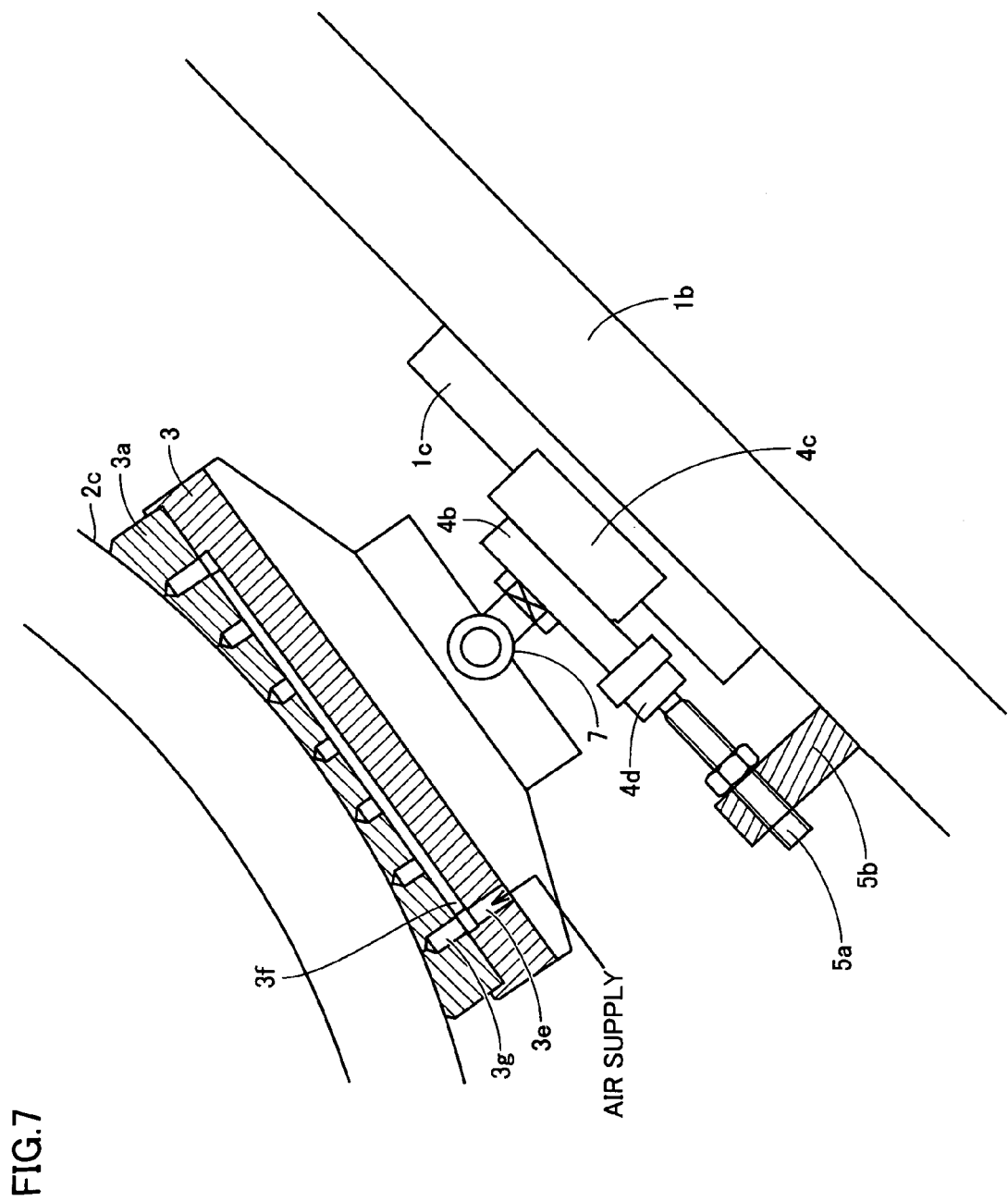
FIG. 7 is a partially fragmented schematic diagram showing the structure of a hydrostatic gas bearing according to a second embodiment of the present invention.

A hydrostatic gas bearing according to a second embodiment of the present invention is basically similar in structure to the aforementioned hydrostatic gas bearing according to the first embodiment. The hydrostatic gas bearing according to the second embodiment is different from that according to the first embodiment in a point that a coupling portion coupling a radial bearing pad 3 to a linear motion guide 1c serving as a moving member has a structure shown in FIG. 7. More specifically, the coupling portion is constituted of a hinge 7. Hinge 7 is arranged so as to render radial bearing pad 3 movable only in the circumferential direction of an outer peripheral surface 2c.

In other words, hinge 7 supports radial bearing pad 3 to be freely inclinable with respect to linear motion guide 1c in the circumferential direction of a rotor. Therefore, radial bearing pad 3 is movable in the circumferential direction of the rotor while varying the inclination with respect to linear motion guide 1c with the shape of outer peripheral surface 2c of the rotor opposed to radial bearing pad 3.

When the coupling portion is constituted of hinge 7, the direction where radial bearing pad 3 is inclinable with respect to linear motion guide 1c is limited to the movable direction of hinge 7. When the movable direction of hinge 7 is matched with the circumferential direction of the rotor, radial bearing pad 3 can be prevented from inclination in the axial direction of the rotor. In other words, no additional member (stopper plate, for example) may be provided for regulating inclination of radial bearing pad 3 in the axial direction of the rotor, whereby the structure of the hydrostatic gas bearing can be more simplified.

While the same numbers of axial bearing pads 6 are provided on the front and rear sides respectively in the above description, axial bearing pads 6 may be arbitrarily arranged so as to be capable of axially supporting rotating gantry 2. When factors of axial bearing pads 6 such as the diameter and the number of air supply holes 3g, for example, are adjusted, the forces of axial bearing pads 6 axially pressing rotating gantry 2 can be arbitrarily adjusted. Even if the factors and the arrangement of axial bearing pads 6 are arbitrarily set, the sum of the moments acting on rotating gantry 2 is reduced when the factors and the arrangement of axial bearing pads 6 are arranged so that the sum of the moments acting on rotating gantry 2 due to the forces of plurality of axial bearing pads 6 pressing rotating gantry 2 is in the direction opposite to the moment acting on rotating gantry 2 due to the loaded substances. Thus, loaded substances having larger weights can be loaded on rotating gantry 2.

While the hydrostatic gas bearing supports rotating gantry 2 of the CT scanner in the above description, the present invention is not restricted to the CT scanner and rotating gantry 2 thereof but is also applicable to another rotator comprising a large-sized rotor.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hydrostatic gas bearing supporting a rotor, comprising:
   a radial bearing pad radially supporting said rotor;
   a moving member moving said radial bearing pad; and
   a coupling portion swingably coupling said radial bearing pad to said moving member, wherein:
   said moving member moves said radial bearing pad in a first direction intersecting with a second direction connecting the center of rotation of said rotor and said coupling portion with each other; and
   an angle formed by the first direction and the second direction varies with the movement of said radial bearing pad.

2. The hydrostatic gas bearing according to claim 1, wherein:
   said moving member includes a ball stud having a spherical forward end,
   a recess is formed on a portion of said radial bearing pad not opposed to said rotor, and
   said coupling portion is formed by inserting said forward end of said ball stud into said recess.

3. The hydrostatic gas bearing according to claim 1, wherein
   said coupling portion is constituted of a hinge rendering said radial bearing pad swingable only in the circumferential direction of said rotor.

4. The hydrostatic gas bearing according to claim 1, wherein said moving member includes a linear motion guide for moving said radial bearing pad by rectilinear reciprocation of said linear motion guide.

5. A rotator comprising:
   a rotor including a hollow cylindrical protrusion;
   a plurality of hydrostatic thrust gas bearings including an axial bearing pad, said plurality of hydrostatic thrust gas bearings axially supporting said rotor with the static pressure of compressed gas; and
   a plurality of hydrostatic journal gas bearings including a radial bearing pad, said plurality of hydrostatic journal gas bearings radially supporting said rotor with the static pressure of compressed gas on said hollow cylindrical protrusion, wherein each of said hydrostatic journal gas bearing is the hydrostatic gas bearing according to claim 1.

6. The rotator according to claim 5, wherein the outer diameter of said hollow cylindrical protrusion is smaller than the maximum outer diameter of said rotor.

7. The rotator according to claim 5, wherein
   said rotor is so arranged that the axial direction thereof is horizontal,
   said rotor includes a loading portion for loading a loaded substance on one side of said axial direction, and
   the sum of moments acting on said rotor due to axial forces applied by a plurality of said axial bearing pads to said rotor is in a direction opposite to a moment acting on said rotor due to gravity acting on said loaded substance.

8. The rotator according to claim 5, wherein
   a plurality of said axial bearing pads include at least one first-side axial bearing pad supporting said rotor from a first side in said axial direction and at least one second-side axial bearing pad supporting said rotor from a second side opposite to said first side, and
   a resultant force exerted by said at least one first-side axial bearing pad on said rotor in said axial direction and a resultant force exerted by said at least one second-side axial bearing pad on said rotor in said axial direction are equal in magnitude and opposite in direction to each other.

9. The rotator according to claim 5, wherein
   said hollow cylindrical protrusion is so formed that the size of said hollow cylindrical protrusion in said axial direction is larger than the maximum size of a structure for axially supporting said rotor in said axial direction.

10. The rotator according to claim 5, wherein
   a plurality of said axial bearing pads are in symmetry with respect to a vertical plane passing through the center of rotation of said rotor.

11. The rotator according to claim 5, wherein
   a plurality of said radial bearing pads are in symmetry with respect to a vertical plane passing through the center of rotation of said rotor.

12. A CT scanner comprising:
   the rotator according to claim 5; and
   a radiation source and a radiation detector loaded on said rotor of said rotator.

* * * * *